July 17, 1962

G. F. STETZLER 3,045,184

COMPONENT SORTING CIRCUIT

Filed Aug. 17, 1959

INVENTOR
G. F. STETZLER
S. Gundersen
ATTORNEY

By

United States Patent Office 3,045,184
Patented July 17, 1962

3,045,184
COMPONENT SORTING CIRCUIT
Grant F. Stetzler, Temple, Pa., assignor to Western Electric Company, Incorporated, a corporation of New York
Filed Aug. 17, 1959, Ser. No. 834,173
2 Claims. (Cl. 324—158)

This invention relates to the testing of electrical devices and more particularly to the automatic testing of diodes.

In the manufacture of some types of electrical components it is important that certain electrical values be accurately determined for each device so that they may be sorted into groups, each having an upper and lower limit value. For example, electrical diodes are classified by their reverse breakdown voltage into a group having a reverse breakdown voltage of between 165 and 135 volts, another group having a reverse breakdown voltage of between 110 and 90 volts, etc. Components have been tested for such classification by manual insertion into a number of testing apparatus, each having a predetermined upper and lower limit. If the component falls within one of the ranges of the testing apparatus, it drops into the hopper designated for receiving components of a particular range.

An object of this invention is to provide a circuit for testing one electrical characteristic of a device against a series of predetermined value ranges.

A further object of this invention is to provide such testing apparatus which is automatic in operation and has a small number of components.

In accordance with this invention an operator inserts an electrical component into the testing apparatus. The device is tested in sequential steps, against a series of predetermined ranges by whether the voltage, or current, through the device triggers a high or a low limit switching device. The tests are time controlled so that they may be regulated to coordinate with other manufacturing and testing processes. A preferred embodiment utilizes only two amplifiers, such as gas tubes, and two limiting relays for all of the test ranges. Upon completion of testing, by well-known mechanical apparatus under the control of the limiting relays, the device falls into a selected hopper in which all the tested devices of one range of values are collected.

Figure 1:
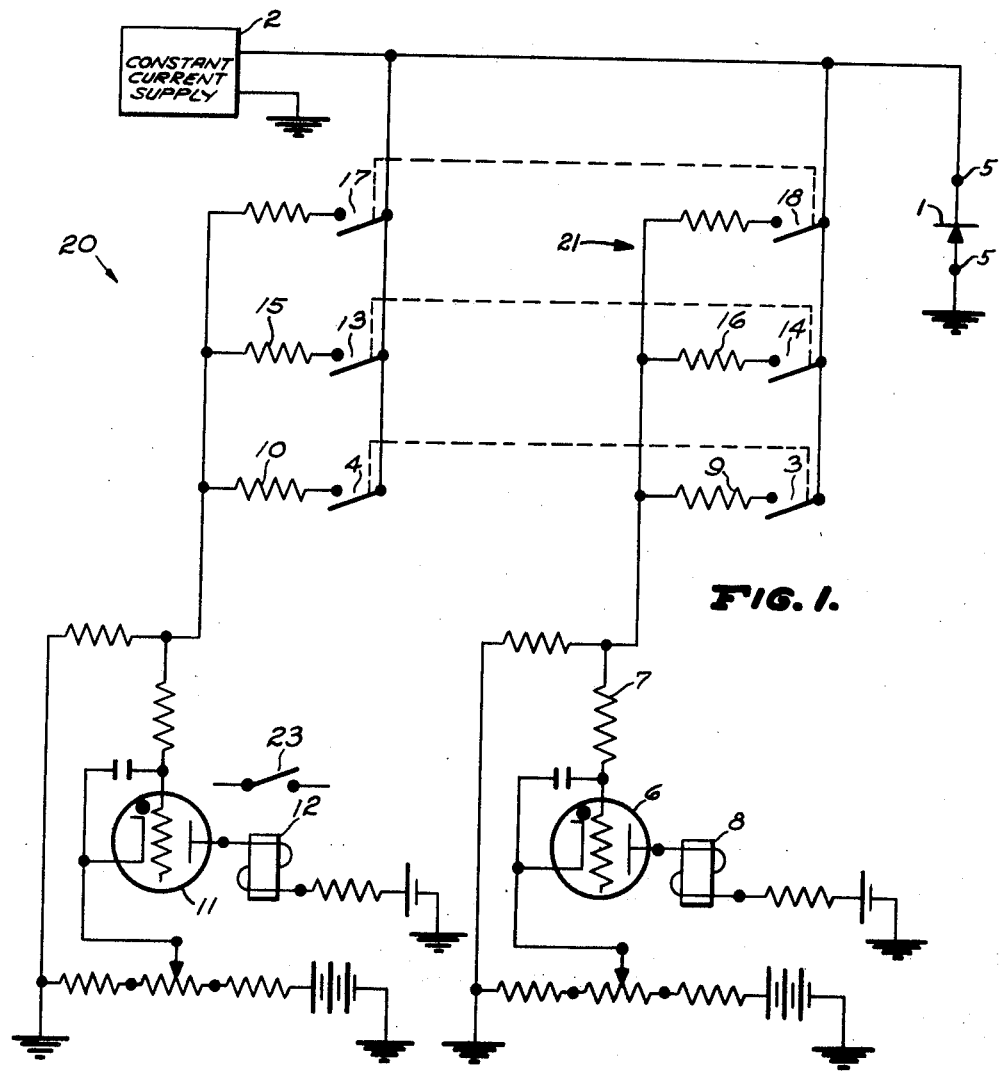
Figure 2:
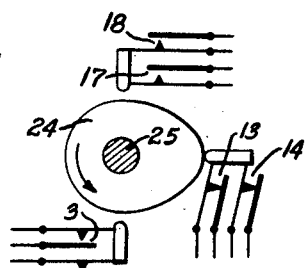

Other objects of this invention will appear in the detailed description to follow in connection with the drawings wherein:

FIG. 1 shows a schematic diagram of a circuit for testing the reverse breakdown voltage of diodes; and FIG. 2 schematically illustrates a timing arrangement for testing diodes sequentialy in a series of voltage test ranges.

In the drawing, diode 1 under test is positioned either manually or by automatic means in testing clamp 5. Clamp 5 connects the diode into a test circuit and may comprise simple test terminals or automatic contactors. Electric energy is supplied by constant current source 2 in the backward direction across diode 1. The backward direction of the diode is that direction opposite to the normal electron flow when the diode operates as a rectifying device. Until reaching the breakdown point the diode presents a high substantially infinite impedance to electrical potential applied in the backward direction. At its breakdown point, current passes through the diode in the backward direction. For example, if the reverse breakdown voltage of diode 1 is 150 volts, with backward voltage of under 150 volts the diode presents an extremely high impedance with no appreciable current flow, but with voltages in excess of 150 volts it conducts.

Two testing circuits 20 and 21 are connected in parallel with diode 1. With current source 2 of 600 volts, in the absence of diode 1, the voltage across circuits 20 and 21 is 600 volts. When diode 1 is connected in parallel the breakdown point of diode 1 becomes the upper limit of the voltage to circuits 20 and 21. For example, if the breakdown point of diode 1 is 160 volts, the voltage to circuits 20 and 21 is 160 volts and current passes through diode 1.

The sequential operation of contacts 3, 4; 13, 14; and 17, 18 is performed by a timing device shown schematically in FIG. 2. Cam 24 mounted on shaft 25 operates the contacts in sequence. "Contacts" refer to any device for opening and closing an electrical circuit such as relays, mechanically operated switches and electronic devices such as gas filled diode tubes. Such timing device may, if desired, comprise a series of cams operating from a constantly rotating motor which mechanically open and close the contacts of switches, a series of time delay relays or slow release relays.

For the first test, a pair of contacts 3 and 4 are simultaneously closed by operation of the timing device. Contacts 3 connect a 78 megohm resistance 9, and contacts 4 connect a 65 megohm resistance 10 in high limit and low limit relay control circuits, respectively, in parallel with the circuit of diode 1 under test. If the backward voltage exceeds 165 volts, the voltage applied to the thyratron tube 11 through contacts 4 and resistances 10 is sufficient to cause thyratron tube 11 to conduct, operating high limit relay 12. High limit relay 12 operates to close its normally open contacts 23 to operate a reject relay (not shown). Meantime, the low limit relay 8 will also have operated, but the operation of relay 12 breaks the circuit to the relay 8 contacts. By controlled electro-mechanical apparatus (not shown) diode 1 falls into the hopper for rejected diodes (those rejected for a backward voltage exceeding 165 volts). As an alternative to electro-mechanical sorting, other control means, such as indicating lamps or bells to alert a sorting operator, may be utilized to sort devices. If the backward voltage through diode 1 is above 135 volts, but less than 165 volts, sufficient voltage is applied through resistor 7 to cause gas tube (thyratron) 6 to conduct. Conduction of tube 6 causes low limit relay 8 to operate, which provided that high limit relay 12 does not simultaneously operate, operates electro-mechanical sorting apparatus (not shown). Operation of low limit relay 8 alone also starts the test for the next diode to be tested, or starts a next series of tests on diode 1. If neither relays 8 nor 12 operate, diode 1 has a backward voltage of below 135 volts.

One-fourth of a second after the start of the test for the 135–165 volt range assuming the reverse voltage of the diode under test does not fail within that range, the diode is tested for the next range of limit values, 110 to 90 volts. The pair of contacts 3 and 4 are opened and the normally open pair of contacts 13 and 14, for the high and low limit tests respectively, are closed.

Resistance 15, of 43 megohms and resistance 16 of 54 megohms are inserted in the diode circuit for the high limit and low limit tests respectively. If the high limit relay does, however, operate, the diode is rejected. If only low limit relay 8 operates, the diode is within the 90–110 volt range and falls into the preselected hopper and the series of tests is started for the next diode to be tested. If high limit relay 12 and low limit relay 8 both fail to operate, after one-fourth of a second from the start of the second test, the third test is commenced.

The third test of the series for the range 60–75 volts switches the pair of contacts 17 and 18 closed and opens contacts 13 and 14. In this manner, fourth, fifth, and as many other tests may be performed as desired. The desired number and limit values of categories determine the resistance values and the number of tests to be employed.

Various modifications may be made in this invention without departing from the scope thereof, for example the circuits may be modified for the testing of rectifiers or other electronic components, the high limit test and low limit series may be connected in parallel to each other but with the device under test in series connection thereto, and other tests, such as leakage current and forward voltage tests may be performed.

What is claimed is:

1. Apparatus for testing the reverse breakdown voltage of diodes comprising a pair of terminals between which a diode to be tested is inserted, a voltage source coupled to said terminals, a high limit testing circuit including a first plurality of impedances of preselected magnitudes for testing the upper voltage breakdown limit in a series of voltage ranges and equal in number to the number of said ranges, and a low limit testing circuit connected in parallel with the high limit testing circuit, said low limit testing circuit including a second plurality of impedances of preselected magnitudes for testing the lower voltage breakdown limit in said series of voltage ranges and equal in number to the number of said ranges, there being an upper limit impedance and a corresponding lower limit impedance defining a pair of impedances for each range, indicating means common to all of the pairs of corresponding impedances, switching means for simultaneously selecting a pair of corresponding upper and lower limit impedances for operation by connecting them in a circuit path between one of said terminals and the common indicating means for determining whether the diode under test is within the breakdown range represented by the selected corresponding impedances, and sequencing means for operating the switching means whereby the corresponding high and low limit impedances may be sequentially switched over a plurality of test ranges.

2. Apparatus for testing the reverse breakdown voltage of diodes comprising a pair of terminals between which a diode to be tested is inserted, a voltage source coupled to said terminals, a high limit testing circuit including a first plurality of impedances of preselected magnitudes for testing the upper voltage breakdown limit in a series of voltage ranges and equal in number to the number of said ranges, and a low limit testing circuit connected in parallel with the high limit testing circuit, said low limit testing circuit including a second plurality of impedances of preselected magnitudes for testing the lower voltage breakdown limit in said series of voltage ranges and equal in number to the number of said ranges, there being an upper limit impedance and a corresponding lower limit impedance defining a pair of impedances for each range, indicating means common to all of the pairs of corresponding impedances, said indicating means comprising a thyratron amplifier and a relay for the high limit testing circuit, and a thyratron amplifier and a relay for the low limit testing circuit, the high limit impedances being connectible to the input of the associated thyratron amplifier, and the relays being respectively connected to the outputs of the amplifiers, switching means for simultaneously selecting a pair of corresponding upper and lower limit impedances for operation by connecting them in a circuit path between one of said terminals and the common indicating means for determining whether the diode under test is within the breakdown range represented by the selected corresponding impedances, and sequencing means for operating the switching means whereby the corresponding high and low limit impedances may be sequentially switched over a plurality of test ranges.

References Cited in the file of this patent

UNITED STATES PATENTS

| 2,468,625 | Goetz | Apr. 26, 1949 |
|---|---|---|
| 2,468,843 | Sunstein | May 3, 1949 |
| 2,474,692 | Rossoff | June 28, 1949 |
| 2,479,051 | Sunstein | Aug. 16, 1949 |
| 2,822,518 | Jordan | Feb. 4, 1958 |
| 2,946,950 | Zomber | July 26, 1960 |
| 2,946,951 | Boode | July 26, 1960 |

FOREIGN PATENTS

| 811,303 | Great Britain | Apr. 2, 1959 |